L. Wolf,
Piano Key,
Nº 66,928.   Patented July 16, 1867.
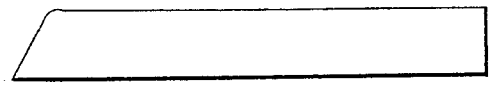
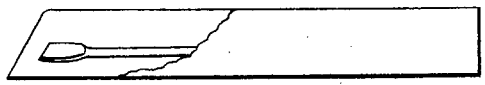
Witnesses:  
Emile H Platt  
D. H. Willard
Inventor:  
Leopold Wolf

United States Patent Office.

LEOPOLD WOLF, OF WEST MERIDEN, CONNECTICUT, ASSIGNOR TO HIMSELF, K. S. HATHAWAY, AND JAMES HAMILTON, ALL OF SAME PLACE.

Letters Patent No. 66,928, dated July 16, 1867.

IMPROVED COMPOSITION FINGER-KEYS FOR PIANO-FORTES.

The Schedule referred to in these Letters Patent and making part of the same.

TO ALL WHOM IT MAY CONCERN:

Be it known that I, LEOPOLD WOLF, of West Meriden, county of New Haven, and State of Connecticut, have invented or discovered certain new and useful improvements in Composition Finger-Keys for Piano-Fortes; and to enable others skilled to make and use the same, I will proceed to describe by referring to the drawings, in which the letters marked thereon indicate like parts in each of the figures.

The nature of this invention will be understood from the specification and drawings.

The object to be obtained thereby is to produce composition finger-pieces to be placed or secured upon finger-keys of piano-fortes and other like instruments which require keys to play music, by means of which said keys can be manufactured more cheaply and rapidly, and more uniformity of shape, susceptible of a higher finish and richness of appearance.

Compositions of various kinds, composed of various kinds of gums, as compositions of vulcanized India rubber, gutta percha, &c., may be employed, but attended with great expense. But in the use of one or all of them the process of forming them will require the use of moulds of the proper or required shape, and give smoothness or polish to the surface thereof. The principal object, however, is to rapidly produce the keys or finger-pieces of the highest brilliancy of finish, and of the cheapest composition therefor.

In the accompanying drawings are shown two views of my improved finger-keys, or finger-pieces for keys, one of which is broken away to show a wire or other material embedded therein, for strengthening purposes while the composition is yet in a plastic state, for which the following composition will proximate:

For ten pounds each of rosin and shellac, I put one-fourth gum copal, the whole dissolved and well mixed together, and thickened with saw-dust or other suitable material, and colored with ivory-black or other material for producing the required color. These ingredients, after having been mixed to a proper consistency, are rolled, cut, heated, and pressed to completion much in the ordinary way of making all or many kinds of compositions into solids. These moulds are made of metal, and are or should be highly finished in order to produce a smooth, lustrous surface.

In this way I am enabled to produce a new and useful article of manufacture, easy and quick of manufacture, cheap and durable for use, uniform and rich in appearance.

What I claim, therefore, and desire to secure by Letters Patent, is—

1. As a new article of manufacture, composition finger-keys for piano-fortes.
2. I claim the process of forming finger-keys for piano-fortes in metallic moulds.
3. I claim a composition for finger-keys for piano-fortes, substantially as described.

LEOPOLD WOLF. [L. S.]

Witnesses:
    D. H. WILLARD,
    ORVILLE H. PLATT.